US011709595B2

(12) United States Patent
Ma et al.

(10) Patent No.: US 11,709,595 B2
(45) Date of Patent: Jul. 25, 2023

(54) MOVING DATA AMONG DISK SLICES LOCATED IN DIFFERENT DISK GROUPS OF AT LEAST ONE STORAGE ARRAY

(71) Applicant: EMC IP Holding Company LLC, Hopkinton, MA (US)

(72) Inventors: Yuetao Ma, Beijing (CN); Changrui Shao, Beijing (CN); Haiying Tang, Beijing (CN); Xiaobo Zhang, Beijing (CN); Chun Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/993,623

(22) Filed: Aug. 14, 2020

(65) Prior Publication Data

US 2021/0342066 A1 Nov. 4, 2021

(30) Foreign Application Priority Data

Apr. 30, 2020 (CN) .......................... 202010365043.5

(51) Int. Cl.
*G06F 3/00* (2006.01)
*G06F 3/06* (2006.01)
*G06F 9/54* (2006.01)

(52) U.S. Cl.
CPC .......... *G06F 3/0604* (2013.01); *G06F 3/0647* (2013.01); *G06F 3/0689* (2013.01); *G06F 9/542* (2013.01)

(58) Field of Classification Search
CPC .... G06F 3/0604; G06F 3/0646; G06F 3/0647; G06F 3/0689
See application file for complete search history.

(56) References Cited

U.S. PATENT DOCUMENTS

| 11,023,147 B2 | 6/2021 | Shang et al. | |
| 11,042,324 B2 | 6/2021 | Shveidel et al. | |
| 11,157,172 B2 | 10/2021 | Tang et al. | |
| 2006/0010290 A1* | 1/2006 | Sasamoto | G06F 3/061 |
| | | | 711/170 |
| 2011/0191628 A1* | 8/2011 | Noguchi | G06F 11/16 |
| | | | 714/E11.062 |
| 2012/0110593 A1* | 5/2012 | Cherian | G06F 3/067 |
| | | | 718/104 |
| 2019/0129614 A1* | 5/2019 | Dalmatov | G06F 3/0619 |

* cited by examiner

*Primary Examiner* — Reginald G Bragdon
*Assistant Examiner* — Michael L Westbrook
(74) *Attorney, Agent, or Firm* — BainwoodHuang

(57) ABSTRACT

A technique for storage management involves: determining multiple source disk slices from a storage array that provides redundant storage, a current disk group where each of the multiple source disk slices is located being different from a target disk group where the source disk slice is specified to be located; determining multiple destination disk slices from the target disk group based on the multiple source disk slices, the multiple destination disk slices being used to replace the multiple source disk slices; and causing data to be moved to the multiple destination disk slices from the multiple source disk slices. Accordingly, such a technique may improve the reliability of a storage system.

13 Claims, 5 Drawing Sheets

MOVING DATA AMONG DISK SLICES LOCATED IN DIFFERENT DISK GROUPS OF AT LEAST ONE STORAGE ARRAY

CROSS-REFERENCE TO RELATED APPLICATION

This application claims priority to Chinese Patent Application No. CN202010365043.5, on file at the China National Intellectual Property Administration (CNIPA), having a filing date of Apr. 30, 2020, and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to the field of storage, and more particularly, to a method, an electronic device, and a computer program product for storage management.

BACKGROUND

In the technical field of storage, a storage system includes a large number of independent disks, such as optical disks and magnetic disks. Each disk is divided into multiple disk slices, such as 4 GB disk slices. A specified number of disk slices may form a small redundant array of independent disks (RAID), such as 4+1 RAID5. A reliability model may be used to evaluate the reliability of the RAID. In order to obtain higher RAID reliability, it is necessary to allocate disk slices in a limited number of disks. Therefore, it is necessary to group disks in the storage system, so that disk slices are allocated in a disk group having a limited number of disks.

Since the number of disks in each disk group is limited, the disk group may be reorganized when some new disks are added to the disk group. Specifically, if the number of old disks in the disk group plus the number of new disks is greater than the maximum number of disks that can be included in the disk group, a new disk group will be created and all disks will be allocated to two disk groups. In this case, disk slices originally in the same disk group in a storage array may be located in two different disk groups. Therefore, the storage system needs to be improved to better manage the storage array.

SUMMARY OF THE INVENTION

The embodiments of the present disclosure provide an improved solution for storage management.

In a first aspect of the present disclosure, a method for storage management is provided. The method includes: determining multiple source disk slices from a storage array that provides redundant storage, a current disk group where each of the multiple source disk slices is located being different from a target disk group where the source disk slice is specified to be located; determining multiple destination disk slices from the target disk group based on the multiple source disk slices, the multiple destination disk slices being used to replace the multiple source disk slices; and causing data to be moved to the multiple destination disk slices from the multiple source disk slices.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions. The actions include: determining multiple source disk slices from a storage array that provides redundant storage, a current disk group where each of the multiple source disk slices is located being different from a target disk group where the source disk slice is specified to be located; determining multiple destination disk slices from the target disk group based on the multiple source disk slices, the multiple destination disk slices being used to replace the multiple source disk slices; and causing data to be moved to the multiple destination disk slices from the multiple source disk slices.

In a third aspect of the present disclosure, a computer program product is provided. The computer program product is tangibly stored on a non-transitory computer-readable medium and includes machine-executable instructions that, when executed, cause a machine to implement any step of the method described according to the first aspect of the present disclosure.

This summary is provided to introduce the selection of concepts in a simplified form, which will be further described in the detailed description below. This summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

In each figure, the same or corresponding reference numerals represent the same or corresponding parts.

DETAILED DESCRIPTION

Figure 1:
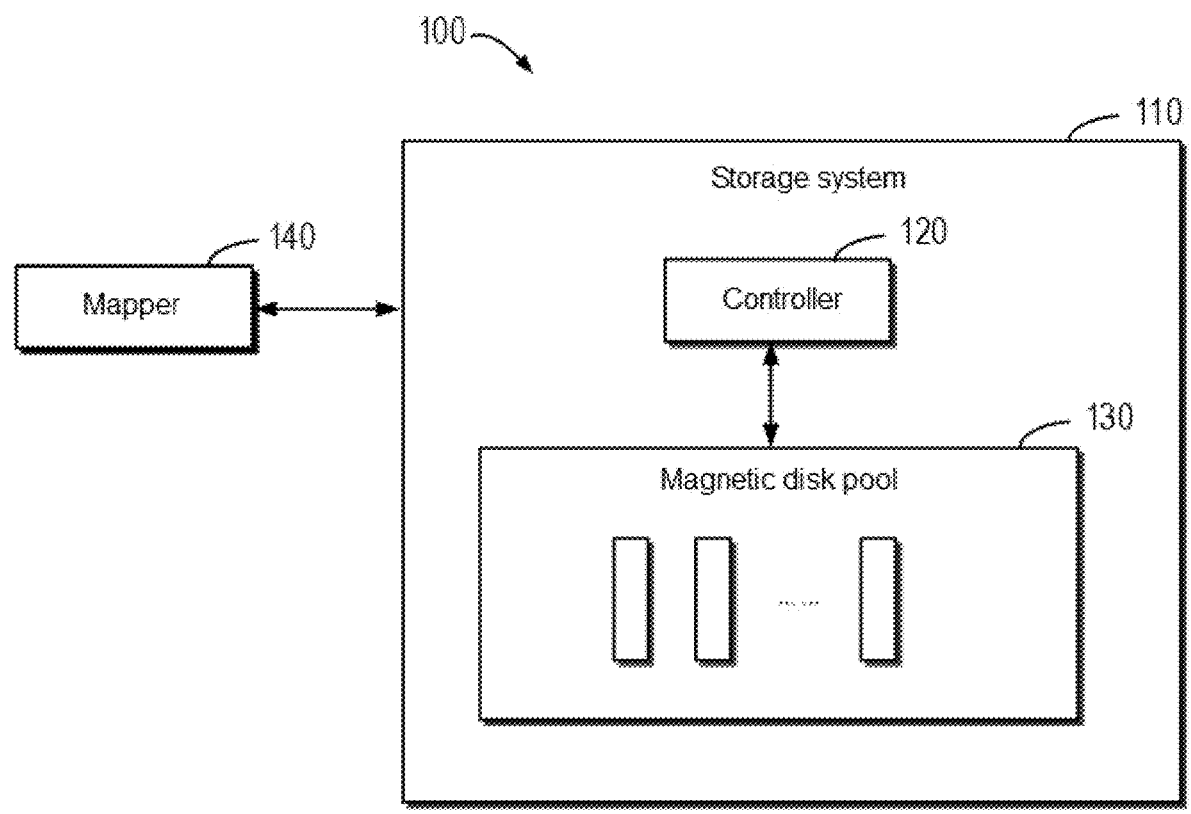
FIG. 1 illustrates a schematic diagram of an example of a storage management environment that can be implemented therein according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete, and will fully convey the scope of the present disclosure to those skilled in the art.

The term "include" and its variants as used herein mean open including, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first", "second", etc. may refer to different or identical objects. Other clear and implicit definitions may be included below.

As described above, in order to obtain higher storage array reliability, it is necessary to group disks in a storage system, so that disk slices of a storage array are allocated in the same disk group. For example, the maximum number of disks that can be included in each disk group may be specified, such as 25 disks. In this case, if the number of disks is greater than the specified number, it is necessary to create more than one disk group. For example, adding a new disk to a disk group may result in the creation of a new disk group, so that the disks in the old disk group may be grouped into the new disk group. As an example, when adding an extra disk to a disk group having 25 disks, a new disk group will be created, and some of the 25 disks in the old disk group may be grouped into the new disk group.

In this case, since the disks originally in the old disk group may be grouped into the new disk group, the disk slices of the storage array originally in the same disk group may be distributed in different disk groups. However, for reasons of ensuring the performance and reliability of the storage array, the disk slices in the storage array should be located in the same disk group. Therefore, the problem of distributing the disk slices of the storage array across the disk groups needs to be solved. Traditionally, in order to solve this problem, it will be checked sequentially whether the disk slices in the storage array are distributed across the disk groups. Once a disk slice is found to be distributed across the disk groups, checking of the remaining disk slices in the storage array will be stopped, and a next storage array will continue to be checked. It can be seen that each check can only find one disk slice distributed across the disk groups. However, in fact, there may be multiple disk slices distributed across the disk groups in one storage array. It is apparent that it is quite inefficient to process only one disk slice distributed across the disk groups at a time.

According to an example embodiment of the present disclosure, an improved solution for storage management is proposed. In this solution, multiple source disk slices are determined from a storage array that provides redundant storage. A current disk group where each of the multiple source disk slices is located is different from a target disk group where the source disk slice is specified to be located. Multiple destination disk slices are determined from the target disk group based on the multiple source disk slices. The multiple destination disk slices are used to replace the multiple source disk slices. Thus, data may be moved to the multiple destination disk slices from the multiple source disk slices.

Therefore, this solution may find all disk slices distributed across disk groups in a storage array in one iteration, and data of the disk slices is copied to idle disk slices located in the same disk group as other disk slices in the storage array. Therefore, this solution may significantly improve the efficiency of storage management and provide better user experience.

Figure 2:
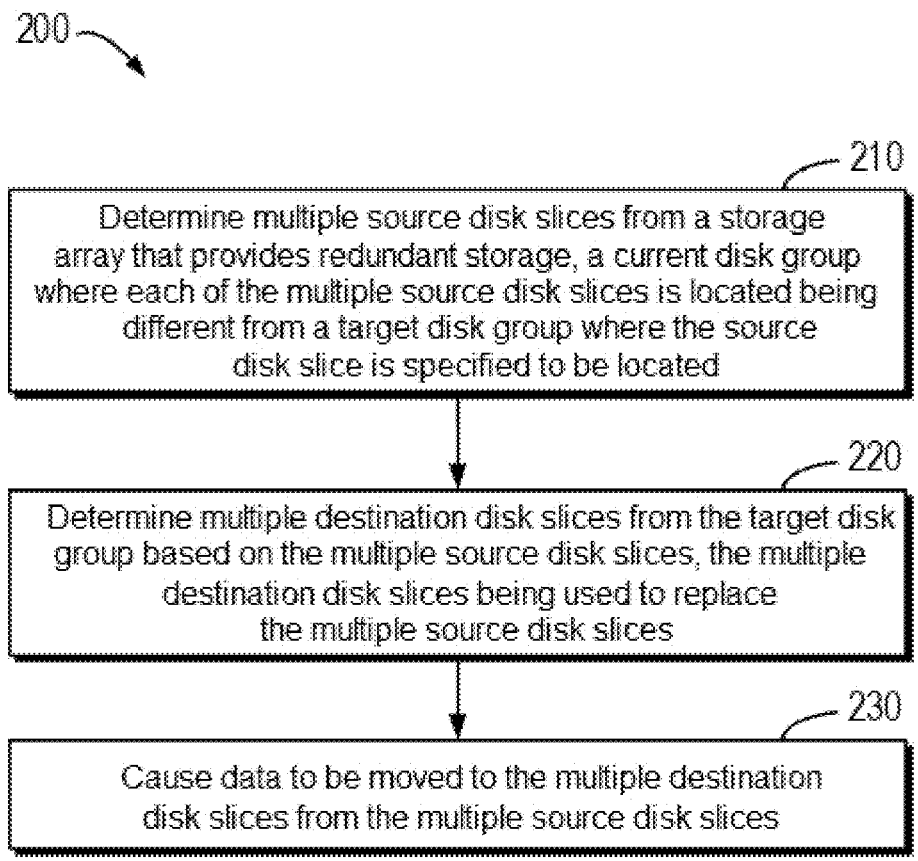
FIG. 2 shows a flowchart of a method for storage management according to some embodiments of the present disclosure.
Figure 3:
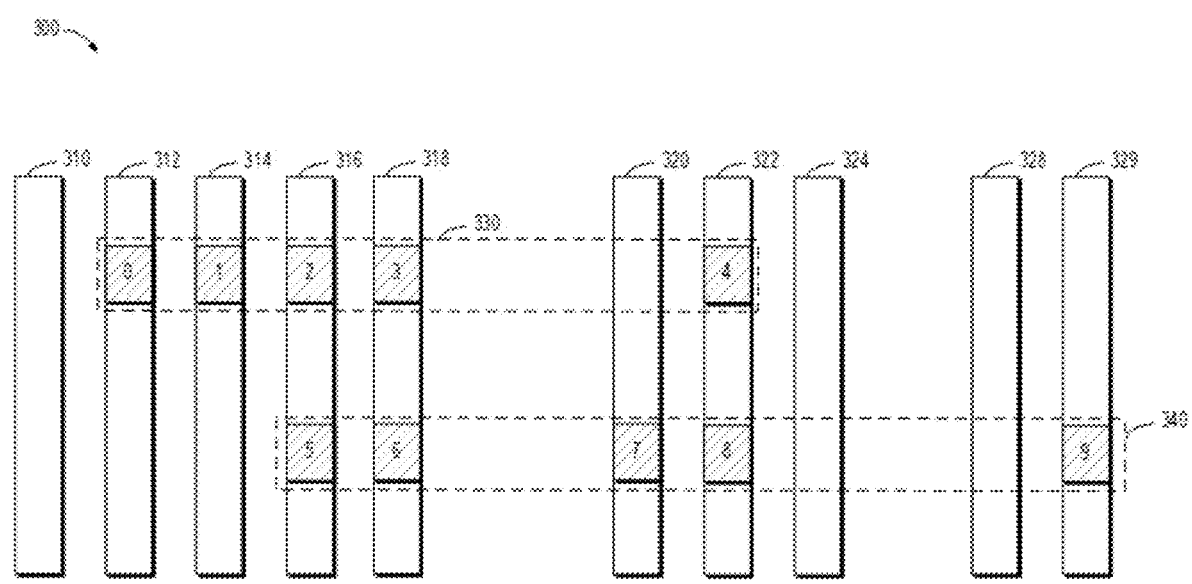
FIG. 3 illustrates a schematic diagram of an example of initial disk slice distribution according to some embodiments of the present disclosure.

Hereinafter, a specific example of this solution will be described in more detail in conjunction with FIGS. 1-3. FIG. 1 illustrates a schematic diagram of an example of storage management environment 100 according to some embodiments of the present disclosure. Storage management environment 100 includes storage system 110 for storing and managing data. Storage system 110 includes controller 120, disk pool 130, and mapper 140.

Disk pool 130 may include multiple disks. The disks in disk pool 130 may have various types. For example, the disk may be an optical disk, a hard disk (such as a mechanical hard disk and a solid-state hard disk), and the like. The disk may be divided into multiple disk slices with a fixed size (for example, 4 GB). A predetermined number of disk slices from different disks may form a storage array. The storage array may provide the functions of an RAID. For example, in the case of RAID 5, five idle disk slices from different disks may be combined into a storage array.

As described above, in order to obtain higher storage array reliability, it is necessary to allocate disk slices in a limited number of disks. Therefore, it is necessary to group the disks in disk pool 130, so that disk slices are allocated in a disk group having a limited number of disks. Each disk group may include multiple disks with a specified number. For example, each disk group may include up to 25 disks to ensure the reliability of the storage array. Each disk group belongs to a failure domain, which means that in the case of a disk failure in a disk group, the reliability of other disk groups will not be affected. Since each disk group belongs to a failure domain, all disk slices in a storage array should always come from the same disk group.

In some cases, a disk group may be split into more than one disk group. Specifically, if the number of disks is greater than the maximum number of disks that can be included in the disk group, more than one disk group needs to be created. For example, adding a new disk to a disk group may result in the creation of a new disk group, so that some disks in the old disk group may be grouped into the new disk group. For example, when adding an extra disk to a disk group having 25 disks, a new disk group will be created, and some of the 25 disks in the old disk group will be grouped into the new disk group.

In this case, since the disks originally in the old disk group may be grouped into the new disk group, the disk slices in the storage array originally in the same disk group may be distributed in different disk groups. However, for reasons of ensuring the performance and reliability of the storage array, the disk slices in the storage array should be located in the same disk group.

To this end, controller 120 may manage the distribution of disk slices in the storage array. Specifically, controller 120 may find all disk slices (hereinafter, referred to as "source disk slices") distributed across the disk groups in the storage array, and determine corresponding destination disk slices from the same disk group (hereinafter, referred to as "target disk group") where other slices in the storage array are located for replacement of the source disk slices. In addition, controller 120 may notify mapper 140 that there is a storage array with disk slices to be replaced, and may provide information of multiple source disk slices. As a core component of management storage system 110, mapper 140 may move data from multiple source disk slices to multiple destination disk slices. After completing data migration, mapper 140 will notify controller 120 that disk slice replacement is complete.

It is to be noted that although controller 120 is shown as being implemented inside storage system 110, controller 120 may alternatively be implemented outside storage system 110 with an implementation position thereof not limited. Controller 120 may include, but is not limited to, cloud computing devices, mainframe computers, servers, personal computers, desktop computers, laptop computers, tablet computers, personal digital assistants, and any other computing-capable devices. Further, although controller 120 and mapper 140 are shown as different entities, they may be implemented as the same entity.

In this way, since controller 120 provides mapper 140 with information on all source disk slices distributed across the disk groups in the storage array, mapper 140 can complete the replacement of all source disk slices in one iteration, thereby significantly reducing the risk of data loss, improving the efficiency of storage management, and providing better user experience.

Figure 4:
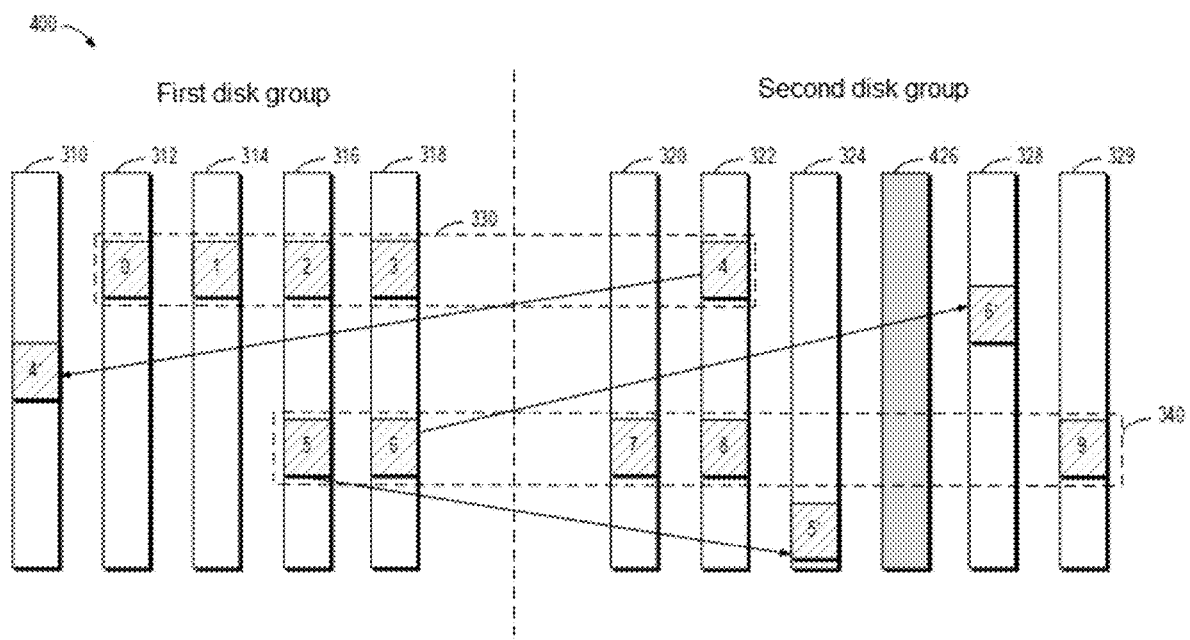
FIG. 4 illustrates a schematic diagram of an example of a storage management process according to some embodiments of the present disclosure.

The operations performed by controller 120 will be described in detail below in conjunction with FIGS. 2-4. FIG. 2 shows a flowchart of method 200 for storage management according to some embodiments of the present disclosure. For example, method 200 may be performed by controller 120 as shown in FIG. 1. It should be understood that method 200 may further include additional steps not shown and/or omit the steps shown, and the scope of the present disclosure is not limited in this regard. For ease of understanding, method 200 will be described with reference to FIGS. 3 and 4. FIG. 3 illustrates a schematic diagram of an example of initial disk slice distribution 300 according to some embodiments of the present disclosure, and FIG. 4 illustrates a schematic diagram of an example of storage management process 400 according to some embodiments of the present disclosure.

At 210, controller 120 determines multiple source disk slices from a storage array that provides redundant storage. A current disk group where each of the multiple source disk slices is located is different from a target disk group where the source disk slice is specified to be located.

For ease of understanding, an example of initial disk slice distribution 300 before a disk group is split will be described first with reference to FIG. 3. As shown in FIG. 3, there is initially only one disk group (hereinafter, referred to as "first disk group"). The first disk group includes disks 310, 312, 314, 316, 318, 320, 322, 324, 328, and 329. Storage arrays 330 and 340 are distributed on the first disk group. Specifically, storage array 330 includes disk slices 0-4 located on disks 312, 314, 316, 318, and 322, respectively. Storage array 340 includes disk slices 5-9 located on disks 316, 318, 320, 322, and 329, respectively.

As described above, in some cases, a disk group may be split into more than one disk group. Specifically, if the number of disks is greater than the maximum number of disks that can be included in the disk group, more than one disk group needs to be created. For example, as shown in FIG. 4, new disk 426 is added to the first disk group, resulting in the creation of a new disk group (hereinafter, referred to as "second disk group"), so that all the disks in the first disk group and the added new disk 426 are grouped into two disk groups. Disks 310, 312, 314, 316, and 318 are retained in the first disk group, while disks 320, 322, 324, 328, and 329 and new disk 426 form the new second disk group.

In this case, storage array 330 and storage array 340 are distributed across the first disk group and the second disk group. Specifically, storage array 330 includes disk slices 0-3 located on disks 312, 314, 316, and 318 in the first disk group, respectively, and disk slice 4 located on disk 322 in the second disk group. Storage array 340 includes disk slices 5-6 located on disks 316 and 318 in the first disk group, respectively, and disk slices 7-9 located on disks 320, 322, and 329 in the second disk group.

In some embodiments, the storage array has attribution information to indicate a target disk group where the storage array and disk slices thereof should be located. It is assumed that the attribution information of storage array 330 indicates the first disk group and the attribution information of storage array 340 indicates the second disk group. Therefore, based on the attribution information, controller 120 may determine multiple disk slices in a current disk group different from a target disk group specified by the attribution information thereof, that is, multiple source disk slices in the storage array.

In some embodiments, multiple storage arrays may form a storage layer accessible to users or other components. Storage system 110 may have storage layers for various purposes, such as a user data storage layer, a mapper storage layer, and a log storage layer. Based on the type of data stored in each storage layer, a different redundant storage strategy may be applied to each storage layer. However, each storage array in each storage layer has the same redundant storage strategy, that is, has the same number of disk slices and the same type of redundant storage. In addition, the storage layer may be expanded as needed. In other words, new storage arrays may be dynamically allocated and added to the storage layer.

Therefore, controller 120 may sequentially determine a storage array having disk slices distributed across the disk groups in each storage layer. Specifically, controller 120 may determine a storage array from a storage layer formed by multiple storage arrays, and determine multiple source disk slices from the storage array. For example, for each storage layer, controller 120 may determine whether there is an allocated storage array in the storage layer. If there is an allocated storage array, controller 120 may determine a current disk group (hereinafter, referred to as "first current disk group") where a disk slice (hereinafter, referred to as "first disk slice") in the storage array is located. In addition, controller 120 may also determine a target disk group (hereinafter, referred to as "first target disk group") where the first disk slice is specified to be located based on the attribution information of the first disk slice. If it is determined that the first current disk group is different from the first target disk group, controller 120 may determine the first disk slice as one of the multiple source disk slices.

For example, for storage array 330, it may be determined whether the disk group where disk slices 0-4 are located is different from the target disk group, and for storage array 340, it may be determined whether the disk group where disk slices 5-9 are located is different from the target disk group. It is assumed that the attribution information of storage array 330 indicates that the disk slices should be located in the first disk group and the attribution information of storage array 340 indicates that the disk slices should be located in the second disk group. However, disk slice 4 is actually located in the second disk group, and disk slices 5-6 are actually located in the first disk group. In this case, for storage array 330, disk slice 4 may be determined as a source disk slice, and for storage array 340, disk slices 5-6 may be determined as source disk slices.

In some embodiments, in order to conveniently identify the source disk slices, controller 120 may generate, based on positions of the multiple source disk slices in the storage array, a bitmap indicating the positions. For example, the bitmap of storage array 330 is (0, 0, 0, 0, 1), and the bitmap of storage array 340 is (1, 1, 0, 0, 0). "0" indicates that disk slices corresponding to the bit are not distributed across the disk groups, and "1" indicates that disk slices corresponding to the bit are distributed across the disk groups. It can be seen that due to the use of the bitmap, all disk slices distributed across disk groups in the storage array may be easily identified.

Further, in some embodiments, controller 120 may put information such as an identifier, bitmap, and target disk group of a storage array identified to have distribution across disk groups into a waiting queue for later processing, for example, for task processing triggered afterwards. The task may acquire the information from the waiting queue, allocate destination disk slices based on the information, mark the data of the storage array as data to be moved, and notify mapper 140. These actions will be described in detail hereinafter. Since the task may also be performed by controller 120, controller 120 will still be described as the main subject hereinafter.

At 220, controller 120 determines multiple destination disk slices from the target disk group based on the multiple source disk slices. The multiple destination disk slices are used to replace the multiple source disk slices. For example, controller 120 may determine disk slice 4' on the first disk group for replacing disk slice 4 on the second disk group, and determine disk slices 5'-6' on the second disk group for replacing disk slices 5-6 on the first disk group respectively.

In some embodiments, controller 120 may determine multiple disk slices in the target disk group as the multiple destination disk slices based on the bitmap. For example, for storage array 330, the bitmap is (0, 0, 0, 0, 1), and controller 120 may determine one idle disk slice from the first disk group as a destination disk slice based on the bitmap. For storage array 340, the bitmap is (1, 1, 0, 0, 0), and controller 120 may determine two idle disk slices from the second disk group as two destination disk slices based on the bitmap.

At 230, controller 120 causes data to be moved to the multiple destination disk slices from the multiple source disk slices. In some embodiments, controller 120 marks the data of the storage array as data to be moved, and sends a notification to mapper 130 for performing the movement of a storage array that there is a storage array with data to be moved to cause mapper 130 to move data from multiple source disk slices in the storage array to multiple destination disk slices. For example, controller 120 may notify mapper 130 that there is a storage array to be moved, and mapper 130 may check whether the storage array has a mark indicating that it is to be moved. If so, mapper 130 moves data from multiple source disk slices of the storage array to multiple destination disk slices. For example, mapper 130 may move data on disk slice 4 to disk slice 4', and move data on disk slices 5 and 6 to disk slices 5' and 6', respectively.

Further, controller 120 causes, in response to receiving a write request for a source disk slice being moved in the multiple source disk slices, data targeted by the write request to be written to the source disk slice being moved and a destination disk slice for replacing the source disk slice being moved. In some embodiments, controller 120 may set a mark indicating that the source disk slice is being moved to indicate that data for the write request of the source disk slice is written in both the source disk slice and the destination disk slice, thereby preventing data loss and ensuring data consistency.

In this way, on the one hand, controller 120 can determine all source disk slices distributed across disk groups in a storage array in one iteration. On the other hand, the mapper can solve, based on information of all source disk slices, the problem of the disk slices distributed across the disk groups in one iteration, thereby significantly reducing the risk of data loss, improving the efficiency of storage management, and providing better user experience.

In addition, since controller 120 supports replacing multiple source disk slices with destination disk slices, controller 120 can also support replacement of all disk slices in the storage array. In this case, in addition to solving the problem of grouping across disk groups, controller 120 may also be used for reallocation and data migration of the disk slices of the entire storage array to balance storage resource utilization. For example, controller 120 may allocate an idle disk slice located on a cold disk with a low usage rate to the storage array, and copy data in a disk slice on a hot disk with a high usage rate in the storage array to the idle disk slice, so as to balance the use of disks. In this way, the life of the disk can be prolonged, the risk of data loss can be reduced, and the response speed of the disk can be increased, thereby improving the efficiency and reliability of storage management.

Figure 5:
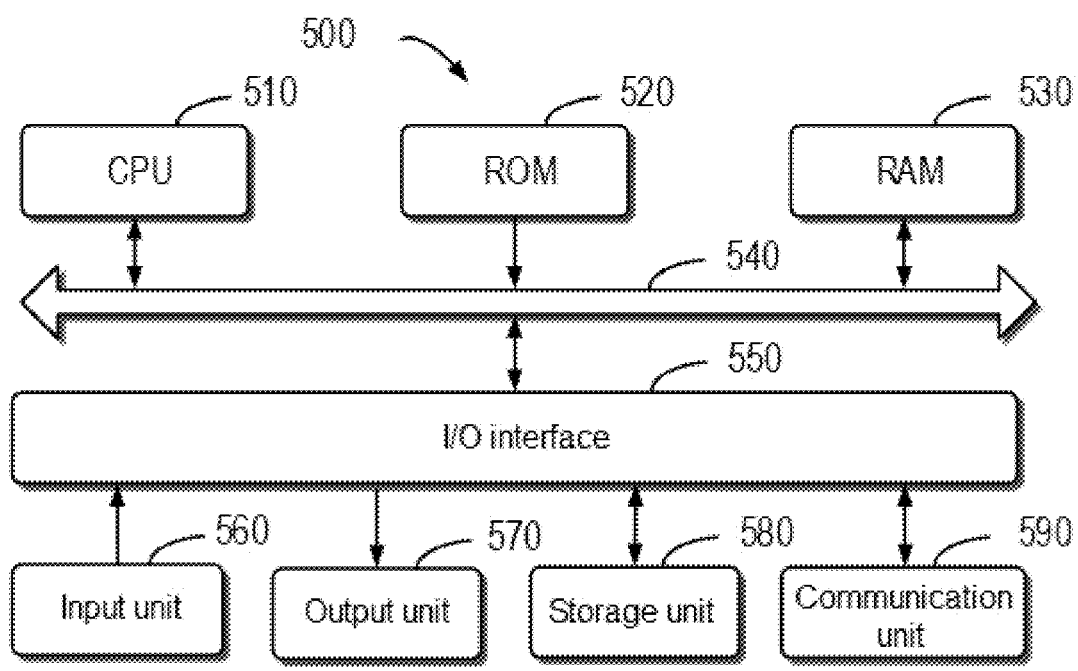
FIG. 5 illustrates a schematic block diagram of an example device that may be used to implement embodiments of the present disclosure.

FIG. 5 illustrates a schematic block diagram of example device 500 that may be used to implement embodiments of the present disclosure. For example, controller 120 as shown in FIG. 1 may be implemented by device 500. As shown in the figure, device 500 includes central processing unit (CPU) 510 that may perform various appropriate actions and processes according to computer program instructions stored in read only memory (ROM) 520 or computer program instructions loaded from storage unit 580 to random access memory (RAM) 530. In RAM 530, various programs and data required for the operation of device 500 may also be stored. CPU 510, ROM 520, and RAM 530 are connected to each other through bus 540. Input/output (I/O) interface 550 is also connected to bus 540.

Multiple components in device 500 are connected to I/O interface 550, including: input unit 560, such as a keyboard or a mouse; output unit 570, such as various types of displays or speakers; storage unit 580, such as a magnetic disk or an optical disk; and communication unit 590, such as a network card, a modem, or a wireless communication transceiver. Communication unit 590 allows device 500 to exchange information/data with other devices over a computer network such as the Internet and/or various telecommunication networks.

The various processes and processing described above, such as method 200, may be performed by processing unit 510. For example, in some embodiments, method 200 may be implemented as a computer software program that is tangibly included in a machine-readable medium, such as storage unit 580. In some embodiments, some or all of the computer programs may be loaded and/or installed onto device 500 via ROM 520 and/or communication unit 590. One or more actions of method 200 described above may be performed when the computer program is loaded into RAM 530 and executed by CPU 510.

The present disclosure may be a method, an apparatus, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM or flash memory), a static random access memory (SRAM), a portable compact disk read only memory (CD-ROM), a digital versatile disk (DVD), a memory stick, a floppy disk, a mechanical coding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages. The computer readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user computer through any type of networks, including an LAN or a WAN, or may be connected to an external computer (e.g., connected through the Internet by using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general purpose computer, a special purpose computer, or other programmable data processing apparatuses, thereby producing a machine such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable the computer, the programmable data processing apparatuses and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate the architecture, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts, and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments, or the technical improvements to technologies on the market, or to enable other persons of ordinary skill in the art to understand the embodiments disclosed here.

The invention claimed is:

1. A storage management method, comprising:
    determining a plurality of source disk slices from a storage array that provides redundant storage, responsive to a determination that a current disk group where each of the plurality of source disk slices is located is different from a target disk group where the source disk slice is specified to be located, wherein the current disk group is a first plurality of disks and the target disk group is a second plurality of disks, wherein at least one of the disks in the first plurality of disks is not in the second plurality of disks, wherein the source disk slices comprise those slices within the storage array that are located on the at least one of the disks in the first plurality of disks that is not in the second plurality of disks, and wherein determining the plurality of source disk slices comprises generating at least one bitmap indicating positions, within the storage array, of those slices within the storage array that are located on the at least one of the disks in the first plurality of disks that is not in the second plurality of disks;
    determining a plurality of destination disk slices from the target disk group based on the bitmap, the plurality of destination disk slices being used to replace the plurality of source disk slices; and
    causing data to be moved to the plurality of destination disk slices from the plurality of source disk slices.

2. The method according to claim 1, wherein determining the plurality of source disk slices comprises:
    determining the storage array from a storage layer formed by a plurality of storage arrays; and
    determining the plurality of source disk slices from the storage array.

3. The method according to claim 2, wherein determining the plurality of source disk slices from the storage array comprises:
    determining a first current disk group where a first disk slice in the storage array is located;
    determining, based on attribution information of the first disk slice, a first target disk group where the first disk slice is specified to be located; and
    determining, if it is determined that the first current disk group is different from the first target disk group, the first disk slice as one of the plurality of source disk slices.

4. The method according to claim 1, wherein causing the data to be moved to the plurality of destination disk slices from the plurality of source disk slices comprises:
    marking the data of the storage array as data to be moved; and
    sending a notification to a mapper for performing the movement of a storage array that there is a storage array to be moved to cause the mapper to move the data to be moved from the plurality of source disk slices in the storage array to the plurality of destination disk slices.

5. The method according to claim 1, further comprising:
    causing, in response to receiving a write request for a source disk slice in the plurality of source disk slices while data in the source disk slice is being moved, data targeted by the write request to be written to both the source disk slice and a destination disk slice in the plurality of destination disk slices.

6. The method according to claim 1, wherein moving the data to the plurality of destination disk slices from the plurality of source disk slices balances storage resource utilization in the storage array.

7. The method according to claim 6, wherein at least one of the source disk slices is located on a disk in the current disk group that has a high usage rate; and
    wherein the data on the source disk slice located on the disk in the current disk group that has the high usage rate is copied to one of the destination disk slices that is idle and that is located on a disk in the target disk group that has a low usage rate.

8. An electronic device, comprising:
    at least one processing unit; and
    at least one memory coupled to the at least one processing unit and storing instructions for execution by the at least one processing unit, wherein the instructions, when executed by the at least one processing unit, cause the device to perform actions, the actions comprising:
    determining a plurality of source disk slices from a storage array that provides redundant storage, responsive to a determination that a current disk group where each of the plurality of source disk slices is located is different from a target disk group where the source disk slice is specified to be located, wherein the current disk group is a first plurality of disks and the target disk group is a second plurality of disks, wherein at least one of the disks in the first plurality of disks is not in the second plurality of disks, wherein the source disk slices comprise those slices within the storage array that are located on the at least one of the disks in the first plurality of disks that is not in the second plurality of disks, and wherein determining the plurality of source disk slices comprises generating at least one bitmap indicating positions, within the storage array, of those slices within the storage array that are located on the at least one of the disks in the first plurality of disks that is not in the second plurality of disks;
    determining a plurality of destination disk slices from the target disk group based on the bitmap, the plurality of destination disk slices being used to replace the plurality of source disk slices; and
    causing data to be moved to the plurality of destination disk slices from the plurality of source disk slices.

9. The device according to claim 8, wherein determining the plurality of source disk slices comprises:
    determining the storage array from a storage layer formed by a plurality of storage arrays; and
    determining the plurality of source disk slices from the storage array.

10. The device according to claim 9, wherein determining the plurality of source disk slices from the storage array comprises:

determining a first current disk group where a first disk slice in the storage array is located;

determining, based on attribution information of the first disk slice, a first target disk group where the first disk slice is specified to be located; and determining, if it is determined that the first current disk group is different from the first target disk group, the first disk slice as one of the plurality of source disk slices.

11. The device according to claim 8, wherein causing the data to be moved to the plurality of destination disk slices from the plurality of source disk slices comprises:

marking the data of the storage array as data to be moved; and sending a notification to a mapper for performing the movement of a storage array that there is a storage array to be moved to cause the mapper to move the data to be moved from the plurality of source disk slices in the storage array to the plurality of destination disk slices.

12. The device according to claim 8, wherein the actions further comprise:

causing, in response to receiving a write request for a source disk slice in the plurality of source disk slices while data in the source disk slice is being moved, data targeted by the write request to be written to both the source disk slice and a destination disk slice in the plurality of destination disk slices.

13. A computer program product having a non-transitory computer readable medium which stores a set of instructions to perform storage management; the set of instructions, when carried out by computerized circuitry, causing the computerized circuitry to perform a method of:

determining a plurality of source disk slices from a storage array that provides redundant storage, responsive to a determination that a current disk group where each of the plurality of source disk slices is located is different from a target disk group where the source disk slice is specified to be located, wherein the current disk group is a first plurality of disks and the target disk group is a second plurality of disks, wherein at least one of the disks in the first plurality of disks is not in the second plurality of disks, wherein the source disk slices comprise those slices within the storage array that are located on the at least one of the disks in the first plurality of disks that is not in the second plurality of disks, and wherein determining the plurality of source disk slices comprises generating at least one bitmap indicating positions, within the storage array, of those slices within the storage array that are located on the at least one of the disks in the first plurality of disks that is not in the second plurality of disks;

determining a plurality of destination disk slices from the target disk group based on the bitmap, the plurality of destination disk slices being used to replace the plurality of source disk slices; and causing data to be moved to the plurality of destination disk slices from the plurality of source disk slices.

* * * * *